United States Patent [19]

Elverskog

[11] Patent Number: 4,619,623
[45] Date of Patent: Oct. 28, 1986

[54] LIFE-JACKET ASSEMBLY

[75] Inventor: Bernt Elverskog, Upplands Väsby, Sweden

[73] Assignee: KB Elverskog Ide & Konstruktion, Upplands Väsby, Sweden

[21] Appl. No.: 681,815

[22] Filed: Dec. 14, 1984

[30] Foreign Application Priority Data

Dec. 16, 1983 [SE] Sweden ................................ 8307002

[51] Int. Cl.⁴ .................................................. B63C 9/00
[52] U.S. Cl. ..................................... 441/126; 441/127; 441/125; 441/123
[58] Field of Search ................................ 441/125–127, 441/129, 131, 123, 106, 111, 80; 244/118.5, 122; 297/191, 188

[56] References Cited

U.S. PATENT DOCUMENTS

| | | | |
|---|---|---|---|
| 802,275 | 10/1905 | Fentrick | 441/126 |
| 2,132,544 | 10/1938 | Shaw | 441/127 |
| 2,257,103 | 9/1941 | Brokering | 441/126 |
| 3,152,343 | 10/1964 | Brown | 441/127 |
| 3,167,794 | 2/1965 | Brown | 441/127 |
| 3,369,262 | 2/1968 | Judd | 441/126 |
| 3,516,098 | 6/1970 | O'Link | 441/126 |
| 3,727,249 | 4/1973 | Bonthelius | 441/127 |

FOREIGN PATENT DOCUMENTS

| | | | |
|---|---|---|---|
| 683513 | 10/1939 | Fed. Rep. of Germany | 441/126 |
| 863690 | 3/1940 | France | 441/126 |
| 136639 | 12/1918 | United Kingdom | 441/126 |

Primary Examiner—Trygve M. Blix
Assistant Examiner—C. T. Bartz
Attorney, Agent, or Firm—Browdy & Neimark

[57] ABSTRACT

The present invention relates to a life-jacket assembly primarily intended for aircraft passengers, including a buoyant body (7) furnishing at least the principal part of the buoyancy, and straps or the like adapted to retain the life-jacket assembly in position on persons in emergency situations, said buoyant body (7) being utilized as upholstery in a chair or the like.

The novel feature is that the life-jacket includes an elongated, generally flat buoyancy body (7) substantially made of buoyancy material, that the life-jacket is entirely contained in an upwardly open compartment in the back-rest of a chair where the buoyant body (7) forms at least part of the upholstery, that an end surface of the life-jacket is provided with a pull handle (6) which is accessible at the top end of the back-rest, and that the generally flat body (7) has, at some distance from that end which is provided with the pull handle, an opening (8) through which the user has to pass his head.

8 Claims, 12 Drawing Figures

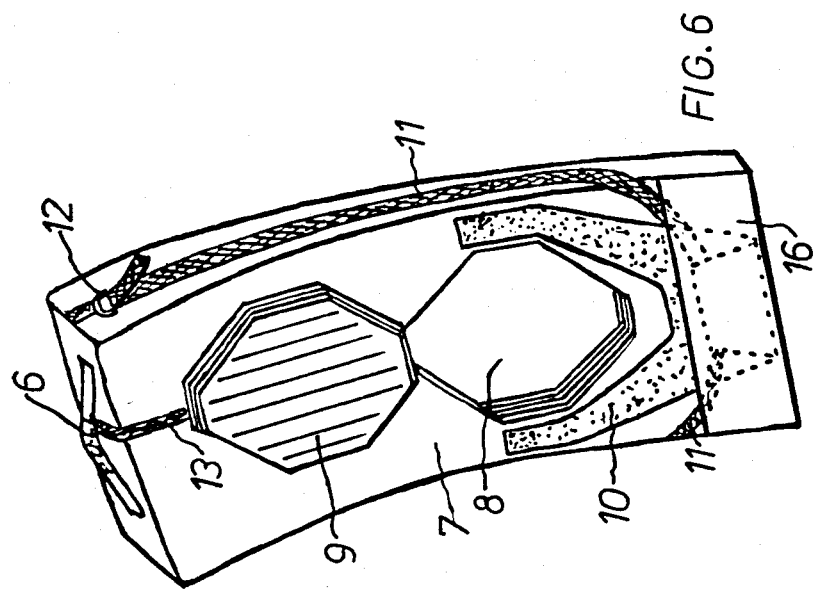
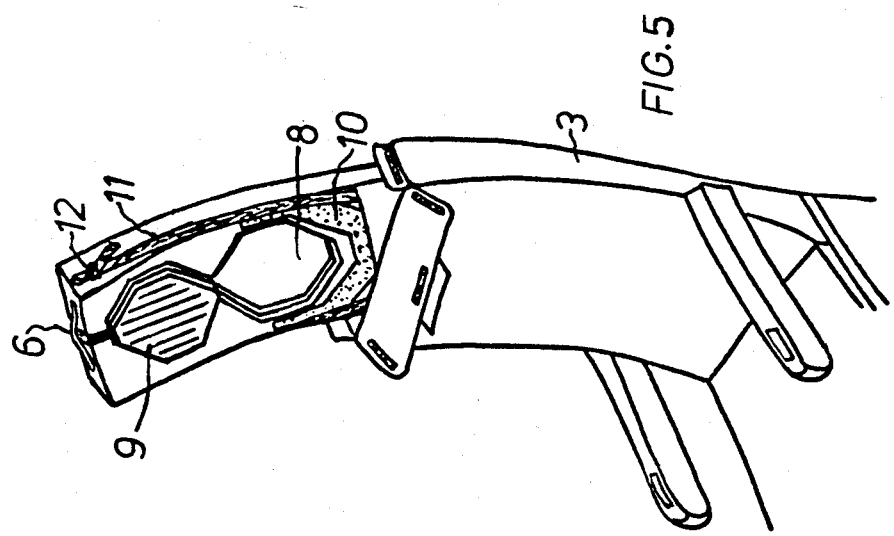

LIFE-JACKET ASSEMBLY

The present invention relates to a life-jacket assembly primarily intended for aircraft passengers, including a buoyant body furnishing at least the principal part of the buoyancy, and straps or the like adapted to retain the life-jacket assembly in position on persons in emergency situations, said buoyant body being utilized as upholstery in a chair or the like.

In most airline companies the cost of fuel is, next to the personnel costs, the heaviest item of expenditure. Since a long time one has therefore endeavoured to reduce the fuel consumption, and the simplest way of achieving this is reducing the deadweight of the aircraft while utilizing available flying material. The fact is that a reduction of the deadweight by 1 kg results in a saving of fuel costs amounting to SEK 0.10–0.15 per flying hour and airplane.

According to current regulations any airplane flying over water shall be provided with one life-jacket for every passenger. A life-jacket has today a weight of about 0.6 kg, i.e. in total between about 50 kg and 200 kg per airplane depending on the number of passenger seats. The life-jackets of current type are accommodated in a specific pocket under every passenger seat where they intrude on the space provided for hand-luggage.

The object of this invention is to provide a solution of the weight-reducing problem while making a life-jacket assembly which in applied condition is more capable than hitherto known life-jackets to keep a person afloat in desired position.

Another object is to provide a life-jacket assembly which can be put on with a minimum of trouble also on persons in sitting position.

The invention is not only intended for use in aircraft but it may also be used in hovercraft, hydrofoil craft and ferries.

The essential characteristic of the life-jacket according to the invention is that it includes an elongated, generally flat buoyant body substantially made of buoyancy material, that the life-jacket is entirely contained in an upwardly open compartment in the back-rest of a chair where the buoyant body forms at least part of the upholstery, that an end surface of the life-jacket is provided with a pull handle which is accessible at the top end of the back-rest, and that the generally flat body has, at some distance from that end which is provided with the pull handle, an opening through which the user has to pass his head.

Embodiments of a life-jacket assembly according to the invention will be described more fully below with reference to the accompanying drawings in which:

FIG. 5 shows how the jacket has been pulled out to a further extent;

FIG. 6 is a perspective view showing the totally extended life-jacket in flat condition;

FIG. 7 shows the life-jacket in the position taken when it is put on;

Figure 7:
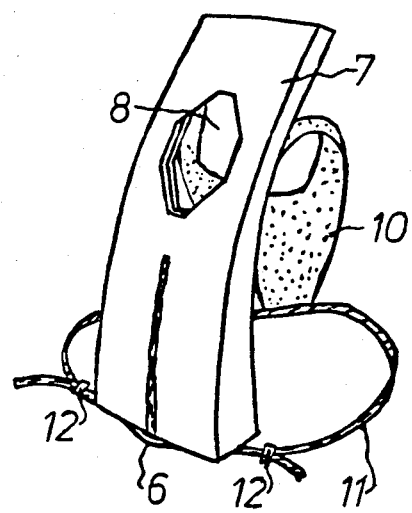
Figure 8:
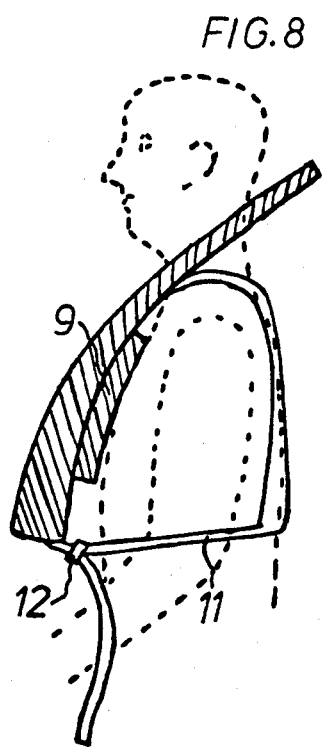
FIG. 8 is a side view showing how the life-jacket is applied.
Figure 9:
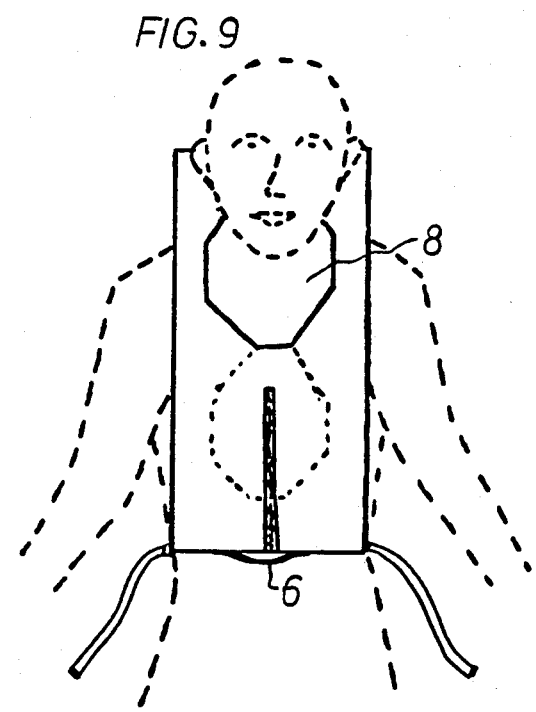
FIG. 9 is a front view corresponding to the side view of FIG. 8.

In an aircraft chair, alternatively a chair in a ship, the life-jacket 2, which is shown in more detail in FIGS. 5, 6 and 7, is localized in the back-rest 3. Provided at the top end of the back-rest are flaps 4, suitably closable by means of Velcro tapes 5, and one end of the life-jacket 2, which is provided with a pull handle 6, is uncovered by opening of these flaps. The life-jacket, the details of which are best shown in FIG. 6, consists of an elongated buoyant body 7 made of a material possessing inherent buoyancy or alternatively made partly of such material completed with sections which increase the buoyancy by being charged with air or gas. The elongated buoyant body 7 is provided with an opening 8 which, in storage position, is filled up by a buoyancy material portion 9. Fastened to the buoyant body 7, suitably covered by fabric, on either side of the opening 8, is a back piece 10 of durable fabric material, and fastened to the free edge thereof is a pair of waist straps 11.

In the position shown in FIGS. 3–6 the back piece 10 is folded along the buoyant body 7, and the waist straps 11 are arranged along the side faces of the buoyant body. Those ends of the waist straps 11 which are remote from the back piece and provided with slide buckles 12, are fastened to the buoyant body and situated beyond the opening 8.

In the embodiment according to FIGS. 3–9 the buoyant material portion 9, which suitably is covered by fabric and which fills out the opening 8 in stored position, is sewn on to the buoyant body 7 along part of one border or is articulated therewith in some other convenient manner so that it can be swung out of the opening 8. Attached to the opposite edge of the filling portion 9 is an elastic strip 13 which extends over the buoyant body 7 end provided with the handle and is fastened on the opposite side thereof.

Figure 4:
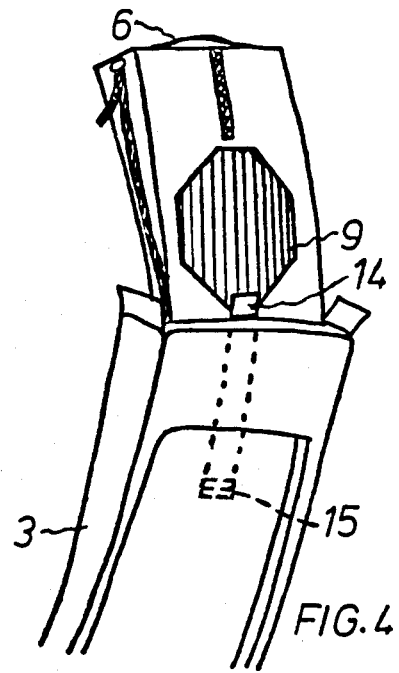
FIG. 4 shows the same as FIG. 3 as seen diagonally from the back.

Attached to that side of the filling portion 9 which is opposite the side where the elastic strip 13 is attached is another strip 14 which extends downwards and is detachably fastened in the back-rest 3 of the chair 1 by means of Velcro tape at the point indicated by 15 in FIG. 4.

To facilitate insertion of the life-jacket into the back-rest 3 the end portion of the life-jacket, with the folded-up back piece 10 and the end portions of the waist straps 11, is surrounded by a loose pocket or bag 16.

When the life-jacket is to be introduced into the back-rest 3 the back piece 10 and the waist straps 11 are, as mentioned, folded up against the buoyant body 7 while the filling portion 9 is inserted in the opening 8. In this connection the elastic strip 13 is stretched and it retains the portion 9 in position until the end of the strip 14 has been connected with the inside of the back-rest at 15. After the life-jacket has been entirely introduced into the back-rest the flaps 4 are closed.

Figure 1A:
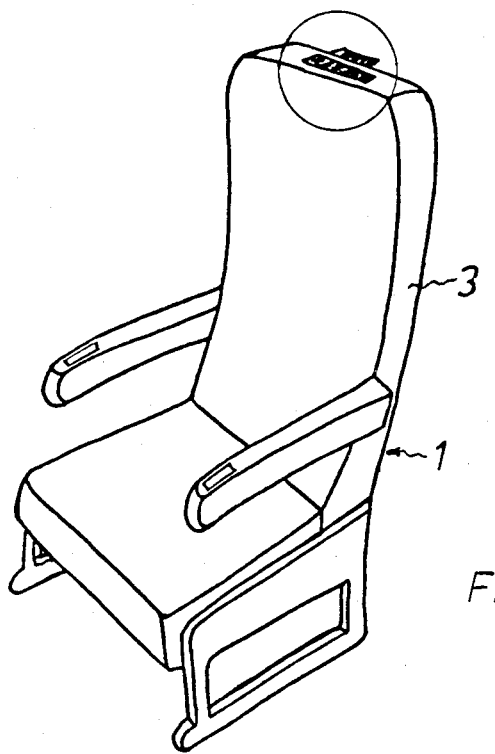
FIG. 1 is a perspective view of an airplane chair provided with the life-jacket according to the invention in stored position.
Figure 1B:
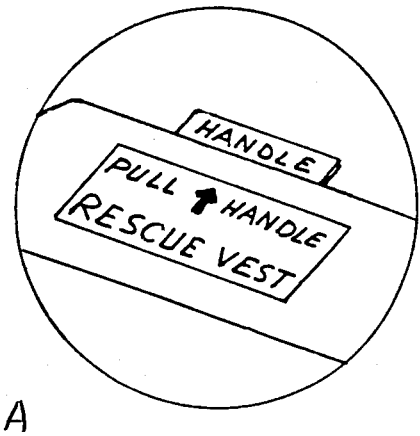
Figure 2A:
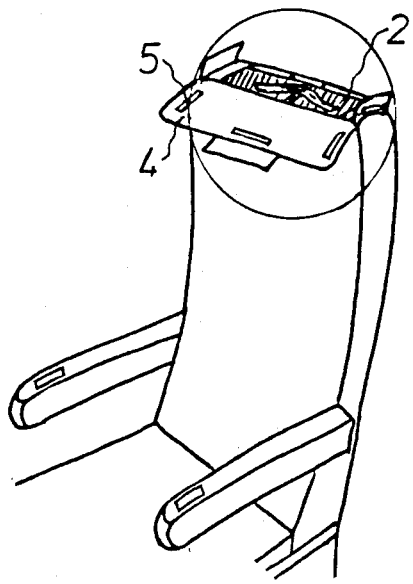
FIG. 2 shows part of the same chair with the end portion of the life-jacket uncovered for pull-out.
Figure 2B:
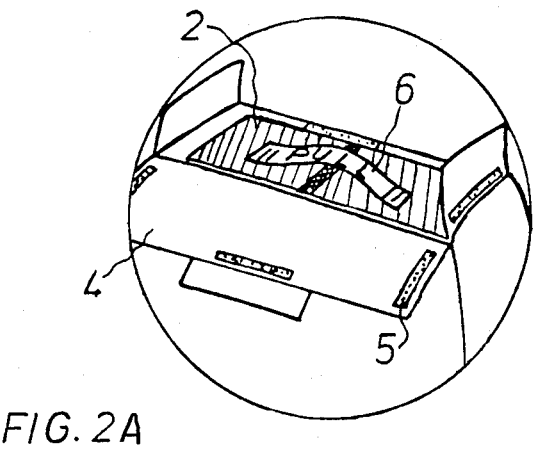
Figure 3:
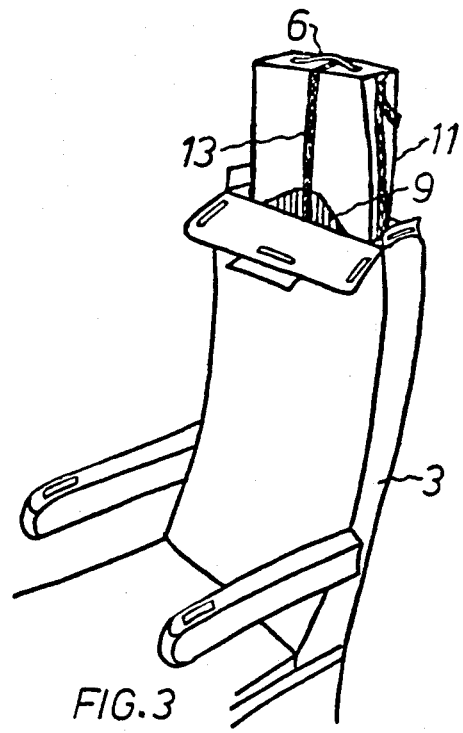
FIG. 3 shows the same as FIG. 2 but here the life-jacket is partly pulled out.

When it becomes necessary to use the life-jacket the passenger opens the flaps 4 so that the pull handle 6 will be uncovered, whereupon he pulls the life-jacket upwards and forwards over his head as indicated in FIGS. 3 and 4. When the life-jacket has reached the position shown in FIG. 4 the strip 14 has been stretched so that the Velcro tape at 15 will let the strip 14 loose. By the influence of the elastic strip 13 the filling portion 9 will now snap forwards and upwards until it will reach the position in FIG. 5. The passenger pulls and bends the jacket forwards and passes his head through the opening 8 and his arms in between the waist straps 11 which have been released during the bending operation. The back-piece 10 will slide down over the passenger's back and then the waist straps can be stretched out. The life-jacket will thus take the position of use shown in FIGS. 8 and 9. The filling portion will be localized against the upper portion of the wearer's chest and contributes to imparting good stability to the wearer in the water while the free portion of the buoyant body 7 situated behind the neck will constitute a support for the head.

Figure 10:
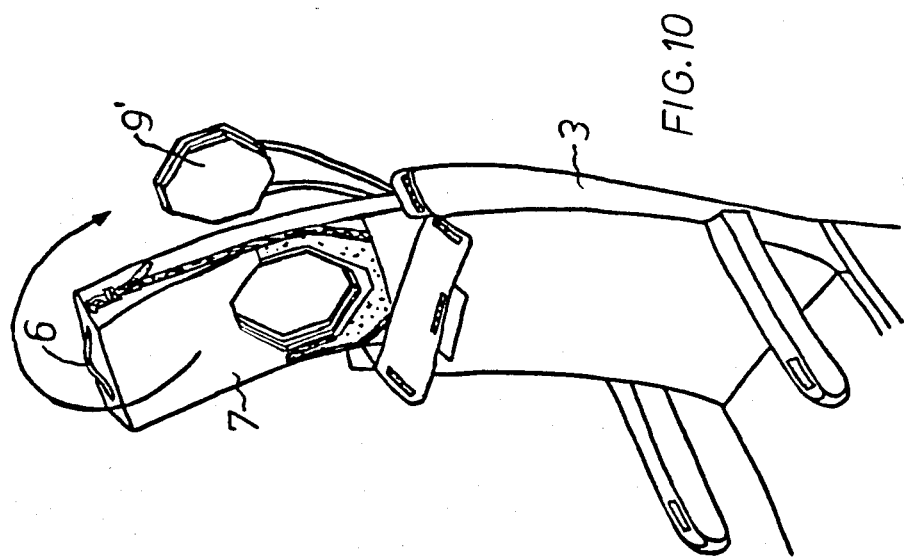
FIG. 10 shows an alternative embodiment of the life-jacket as seen partly pulled out of the chair back.

FIG. 10 shows an alternative embodiment where the filling body 9' is released from the rest of the jacket, as the life-jacket is being pulled out, and remains at the back-rest.

Figure 11:
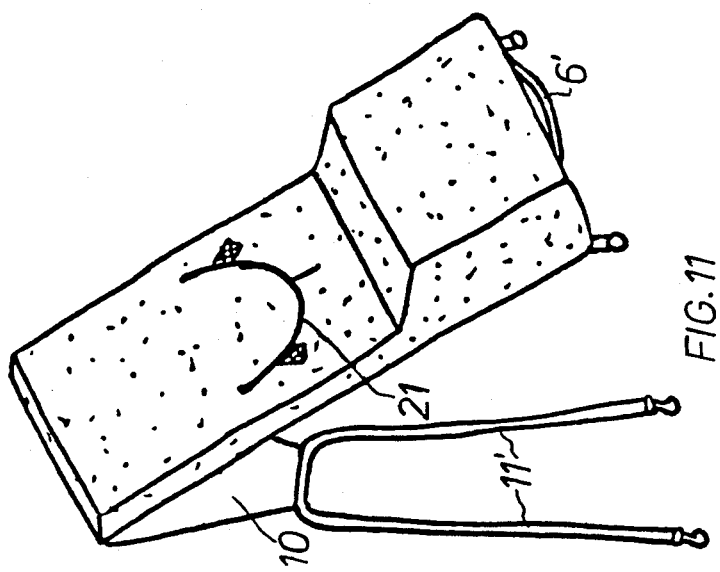
FIG. 11 is perspective view of still another alternative embodiment of the life-jacket.
Figure 12:
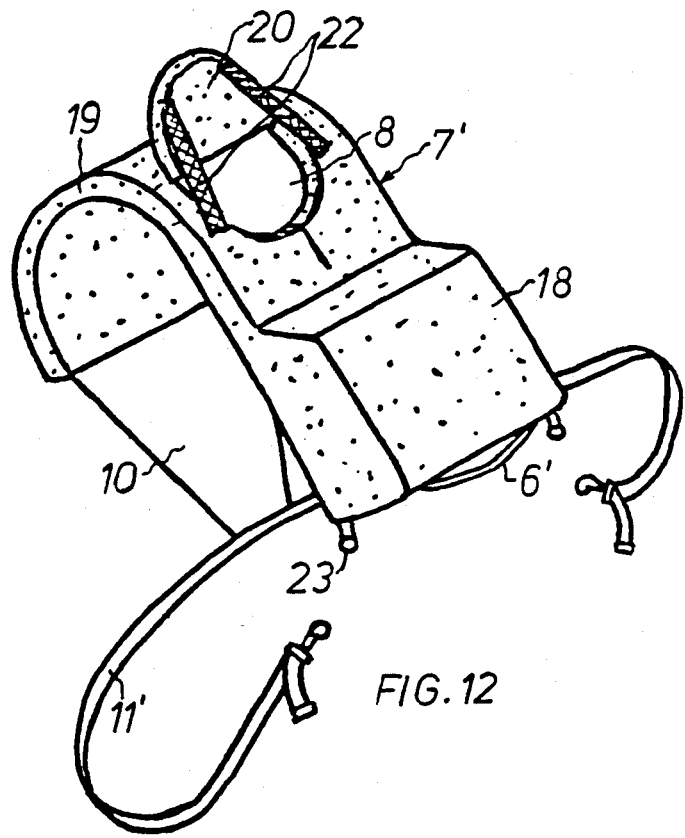
FIG. 12 illustrates the same embodiment as FIG. 11 but with the life-jacket in putting-on position.

In the embodiment according to FIGS. 11 and 12 the life-jacket in stored position is also entirely contained in the chair back-rest where it forms part of, or replaces the upholstery. The back-rest covering is provided with an upwardly directed opening through which the life-jacket is accessible, and the opening has normally a cover, preferably of the same fabric as the rest of the chair back and marked in an appropriate manner. The life-jacket is thus, also in this case, accommodated in the upwardly open compartment inside the chair covering between the side pieces.

The buoyant body 7' is made in one piece and consists of thick end portion 18 which merges in a thinner flexible portion 19 of buoyancy material extending somewhat past an opening 8'. In the position of storage this opening is filled with a portion 9' or a neck cushion 20 defined by a rounded U-shaped slit 21 made in the portion 19. In order to define the position of the unfolded neck cushion there are stay bands 22' arranged between the free edge of the tongue and the edge of the opening formed of the slit 21.

Attached to the remote end of the buoyant material portion 19 is a short back piece 10' and attached to this piece are the waist straps 11'. At the opposite end of the life-jacket assembly loops or like fastening means 23 are fitted to the outer or lower edge of the portion 18. There is also to be found a pull handle 6' which in storage position is accessible under the cover flaps in the chair back.

When the life-jacket assembly is to be used one pulls it up, as described above, while sitting in the chair, by grasping the handle 6' and pulling it upwards-forwards over the head and down against the chest. The buoyant material portion 19 will thus bend and this results in the neck cushion 20 snapping out to its position defined by the stay bands 22' so that the head can be passed through the opening 8' now uncovered. By leaning forwards one can make the back piece 10' and the straps 11' drop down behind the back so that the straps can be fetched and attached around the waist.

It is a great advantage that the life-jacket can be put on in sitting position since the space for movement in airplanes often is limited.

The life-jacket assembly is designed so that it is very apt to replace the upholstery in the back-rest since the thicker section 1" will serve as a filling in the head-rest of the chair.

As it is unnecessary to try to make the buoyant body as compact as possible when utilizing the life-jacket assembly according to the invention its stabilizing capacity and buoyancy will be superior as compared to today's life-jackets.

The invention must not be considered restricted to that described above and shown in the drawings but may be modified in various ways within the scope of the appended claims.

What I claim and desire to secure by Letters Patent is:

1. In a chair for a transportation vehicle, said chair including two armrests, a covered seat bottom and a covered backrest (3) extending upward from said seat bottom, the improvement wherein:

said covered backrest extending forward only to substantially the back of the seat bottom and defining a cavity therein, said cavity completely surrounding a life jacket assembly, said covered backrest having an openable upper end portion for providing access to said cavity; and wherein said cavity contains substantially entirely therein said life jacket assembly, said life jacket assembly comprising an elongated, essentially flat, buoyant body (7), substantially made of buoyancy material, an end surface of said life jacket assembly being provided with a pull handle (6), said pull handle being proximate to and accessible from said openable end portion when said openable end portion is open, said buoyant body (7) defining, at a distance from said end provided with said pull handle (6), an opening (8) adapted for the passage of a user's head therethrough, whereby said life jacket assembly may be withdrawn from said cavity and secured about the body of said user, with said head of said user extending through said opening (8), while said user is seated in said chair.

2. An improved chair as claimed in claim 1, wherein a displaceable material portion (9) of principally the same material as the rest of the buoyant body fills up, in the stored position of the life-jacket, the opening (8) situated at a distance from the ends of the buoyant body but in the position of use of the life-jacket said material portion (9) is removed from said opening (8).

3. An improved chair as claimed in claim 1, wherein a back piece (10) made of flexible fabric material adjacent the opening (8) of the buoyant body (7) is attached to said body which preferably is wrapped with a covering, and that tightenable waist straps (11) fastened to the forward end of the buoyant body which is provided with the handle (6) extend from the free end of said back piece.

4. An improved chair as claimed in claim 2, wherein the displaceable material portion (9) is retained in the position where it fills up the opening (8), against the action of an elastic means (13) tending to remove said portion from the opening of the buoyant body (7) by a detachable fastening means adapted to be rendered inactive as the life-jacket is pulled out from the compartment in the chair back-rest (3).

5. An improved chair as claimed in claim 4, wherein the displaceable material portion (9) filling up the opening (8) is pivotally attached to the rest of the buoyant body and adapted, as the fastening means is rendered inactive, to be swung into abutment against the surface of the buoyant body adjacent the opening in order to provide a concentration of buoyancy on said surface.

6. An improved chair as claimed in claim 2, wherein the elongated buoyant body (7') of the life-jacket has at one end of a thickened portion furnishing the principal part of the buoyancy; that the opening (8) situated at a distance from said thickened portion and the opposite end of the buoyant body is formed of a generally C-shaped slit (21) defining a withdrawable tongue (20), that between the free edge of said tongue and the buoyant body there are arranged stay band (22) adapted to admit limited outward turning or bending of the tongue which in bent-out position serves as a neck rest in the life-jacket, and that the back piece and waist straps (10,11') for fastening the life-jacket to the distressed person are attached to the respective end portions of the essentially flat buoyant body.

7. An improved chair as claimed in claim 2, wherein the buoyant body of the life-jacket, which at least for its major part consists of buoyancy matedral, is adapted to be completed with cavities which can be filled with air or gas.

8. The chair of claim 1 wherein said life jacket assembly is stored in siad cavity in an essentially flat condition for immediate use upon withdrawal from said cavity.

* * * * *